(12) United States Patent
Villarroel

(10) Patent No.: US 8,459,743 B2
(45) Date of Patent: Jun. 11, 2013

(54) DISC RECLINER WITH REDUCED BACKLASH

(75) Inventor: Randolph P Villarroel, Brampton (CA)

(73) Assignee: Magna Seating Inc., Aurora, Ontario (CA)

( * ) Notice: Subject to any disclaimer, the term of this patent is extended or adjusted under 35 U.S.C. 154(b) by 187 days.

(21) Appl. No.: 13/059,986

(22) PCT Filed: Aug. 19, 2009

(86) PCT No.: PCT/CA2009/001158
§ 371 (c)(1),
(2), (4) Date: Feb. 21, 2011

(87) PCT Pub. No.: WO2010/020047
PCT Pub. Date: Feb. 25, 2010

(65) Prior Publication Data
US 2011/0148169 A1 Jun. 23, 2011

Related U.S. Application Data

(60) Provisional application No. 61/090,946, filed on Aug. 22, 2008.

(51) Int. Cl.
*B60N 2/22* (2006.01)
*B60N 2/235* (2006.01)
(52) U.S. Cl.
USPC ............... 297/367 P; 297/367 R; 297/367 L
(58) Field of Classification Search
USPC .................... 297/367 R, 367 P, 367 L
See application file for complete search history.

(56) References Cited

U.S. PATENT DOCUMENTS

| 5,785,386 | A | * | 7/1998 | Yoshida ................... 297/367 R |
| 6,520,583 | B1 | | 2/2003 | Bonk |
| 6,634,713 | B2 | | 10/2003 | Nonomiya et al. |
| 6,824,216 | B2 | | 11/2004 | Uramichi |
| 6,843,533 | B1 | | 1/2005 | Miyata et al. |
| 6,854,802 | B2 | * | 2/2005 | Matsuura et al. ......... 297/367 R |
| 6,910,738 | B2 | | 6/2005 | Bonk |
| 6,991,295 | B2 | | 1/2006 | Peters |
| 7,021,714 | B2 | * | 4/2006 | Oki et al. .............. 297/367 R X |
| 7,334,843 | B2 | | 2/2008 | Yamada et al. |
| 7,341,311 | B2 | | 3/2008 | Ohba |
| 7,360,838 | B2 | | 4/2008 | Smuk |
| 7,588,294 | B2 | * | 9/2009 | Matsumoto et al. ...... 297/367 R |
| 2002/0070596 | A1 | * | 6/2002 | Nonomiya et al. ........... 297/367 |
| 2007/0108825 | A1 | * | 5/2007 | Yamada et al. ............... 297/367 |

FOREIGN PATENT DOCUMENTS

| EP | 1405756 A2 | 4/2004 |
| WO | 2006/016750 A1 | 2/2006 |

* cited by examiner

*Primary Examiner* — Rodney B White
(74) *Attorney, Agent, or Firm* — Miller Canfield

(57) ABSTRACT

A disc recliner mechanism includes a guide plate having a pair of guides and a tooth plate having an inner radial edge with a plurality of teeth. A pawl mounted between the guide and tooth plates includes a radially inner cam surface and a toothed outer edge. The pawl is guided by the guides between a retracted position disengaged with the tooth plate to allow rotational movement of the tooth plate and an extended position engaged with the tooth plate to prevent rotational movement of the tooth plate. A cam rotatably mounted between the guide and tooth plates includes a radially outer cam profile selectively engaging and cooperating with the cam surface. Rotating the cam in a first direction moves the pawl radially outward with respect to the guide plate to the extended position and applies a rotational moment to the pawl thereby wedging the pawl between the guides.

6 Claims, 8 Drawing Sheets

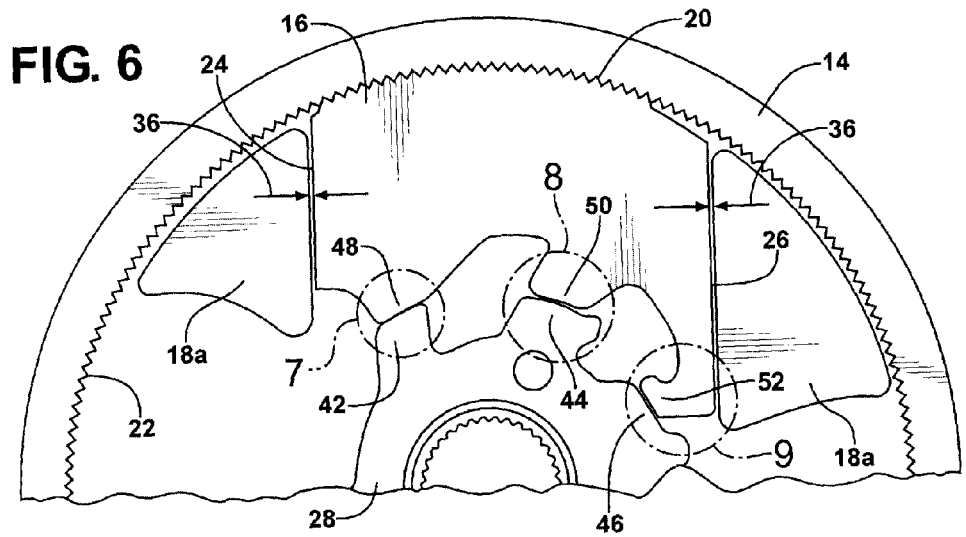
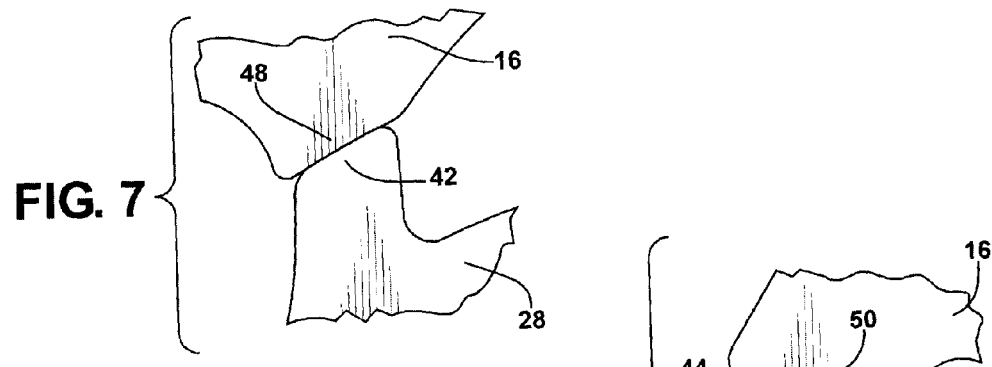
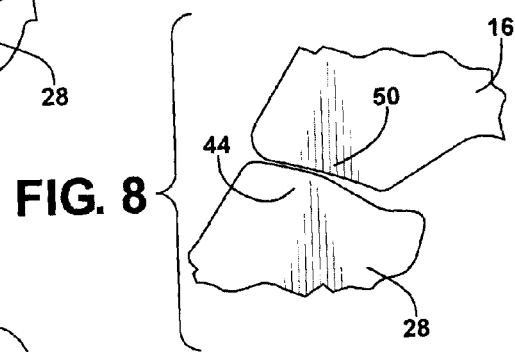
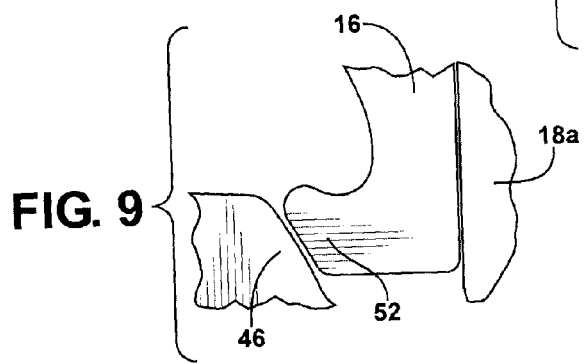

DISC RECLINER WITH REDUCED BACKLASH

CROSS-REFERENCE TO RELATED APPLICATION

This application claims priority to and all the benefits of U.S. Provisional Application No. 61/090,946, filed on Aug. 22, 2008 and entitled "Disc Recliner With Reduced Backlash."

BACKGROUND OF THE INVENTION

1. Field of the Invention

The present invention relates to a disc recliner mechanism for automotive seating with reduced backlash. More specifically, the present invention relates to a disc recliner mechanism which achieves a reduced backlash without requiring additional manufacturing steps.

2. Description of Related Art

Many automotive seats have a seat back whose position, relative to a seat base, can be altered by a vehicle occupant for comfort positioning and/or to provide access to an interior of a vehicle. Disc recliner mechanisms are commonly employed to provide the relative movement between the seat back and the seat base and such disc recliner mechanisms often include a tooth plate and a guide plate, the latter of which includes a set of pawls that can selectively interlock with the tooth plate to maintain the seat back in a desired position.

Typically, the tooth plate portion of the disc recliner mechanism is affixed to the seat back and the guide plate portion of the disc recliner mechanism is affixed to the seat base, although the mechanism can also be mounted in the opposite sense.

While such disc recliner mechanisms are well known and are widely employed, they do suffer from disadvantages. In particular, once the seat back is set in a desired position, any movement of the pawls resulting from excessive clearances between the pawls and guides on the guide plate will result in undesired movement of the seat back with respect to the seat base. Such undesired movement of a positioned seat is typically referred to as "backlash" or "chuck."

To avoid undesired backlash, the pawls and guide plate must be formed to extremely tight tolerances, either directly when the guide plate is formed, or via additional manufacturing steps after the guide plate has been formed. As is apparent to those of skill in the art, meeting such extremely tight manufacturing tolerances or performing additional manufacturing steps both result in increased expense and a desired reduction in backlash may still not be achieved.

It is desired to have a disc recliner mechanism that has reduced or negligible backlash and which can be manufactured at a reasonable cost.

SUMMARY OF THE INVENTION

According to one embodiment of the present invention, a disc recliner mechanism includes a guide plate having at least one pair of guides and a tooth plate having an inner radial edge extending circumferentially therearound. The inner radial edge has a plurality of teeth formed thereon. At least one pawl is mounted between the guide plate and the tooth plate. The pawl includes a radially inner cam surface and a toothed outer edge. The pawl is guided by the pair of guides between a retracted position with the toothed outer edge disengaged with the plurality of teeth to allow rotational movement of the tooth plate relative to the guide plate and an extended position with the toothed outer edge engaged with the plurality of teeth to prevent rotational movement of the tooth plate relative to the guide plate. A cam is rotatably mounted between the guide plate and the tooth plate. The cam includes a radially outer cam profile selectively engaging and cooperating with the cam surface. Rotating the cam in a first direction moves the pawl radially outward with respect to the guide plate to the extended position and applies a rotational moment to the pawl thereby wedging the pawl between the pair of guides.

BRIEF DESCRIPTION OF THE DRAWINGS

Advantages of the present invention will be readily appreciated as the same becomes better understood by reference to the following detailed description when considered in connection with the accompanying drawings wherein:

FIG. 6 is a fragmentary, cross-sectional view of the disc recliner of the first embodiment with the cam in an initial locking position;

FIG. 7 is an enlarged view of a first area of FIG. 6 indicated by circle 7;

FIG. 8 is an enlarged view of a second area of FIG. 6 indicated by circle 8;

FIG. 9 is an enlarged view of a third area of FIG. 6 indicated by circle 9;

DETAILED DESCRIPTION OF THE EMBODIMENTS

Figure 1:
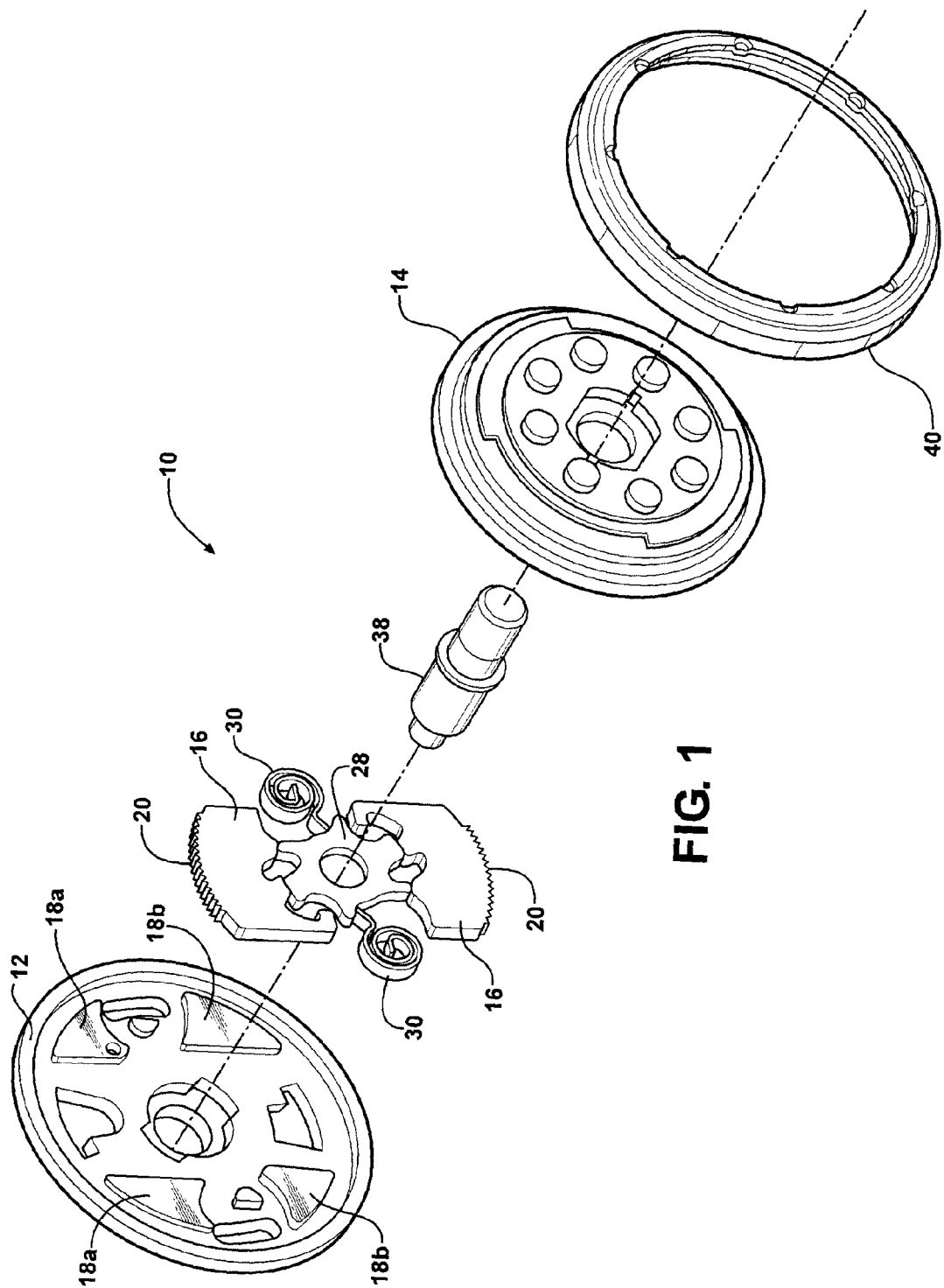
FIG. 1 is an exploded view of a disc recliner according to a first embodiment of the invention.

A disc recliner in accordance with a first embodiment of the present invention is indicated generally at 10 in FIG. 1. The disc recliner 10 includes a guide plate 12 and a tooth plate 14. A pair of pawls 16 ride between respective pairs of guides 18a and 18b formed in the guide plate 12 such that a toothed outer edge 20 of the pawls 16 can be brought into and out of engagement with complementary teeth 22 formed on an inner radial edge of the tooth plate 14, when the disc recliner 10 is assembled. The pawls 16 have opposite, substantially parallel, first and second sides 24, 26. The respective pairs of guides 18a, 18b are spaced apart and have opposing, substantially parallel inner guiding surfaces.

A cam 28 engages a radially inner cam surface of the pawls 16 to move the pawls 16, and more specifically, the toothed outer edge 20 of the pawls 16 toward and away from the teeth 22 on the inner radial edge of the tooth plate 14. A pair of springs 30 bias the cam 28 in a first direction (counterclockwise when viewed from FIGS. 2-13) toward a position wherein the pawls 16 are in an extended position, shown in FIG. 4. In the extended position, the pawls 16 are rotated in a second direction (clockwise when viewed from FIGS. 2-13) such that the first and second sides 24, 26 of the pawls 16 engage the guides 18a, 18b at first and second contact points 32, 34, respectively. Additionally, in the extended position, the toothed outer edge 20 of the pawls 16 is engaged with the teeth 22 on the inner radial edge of the tooth plate 14. When the pawls 16 are in the extended position, the disc recliner 10 is locked to prevent relative rotational movement between the guide plate 12 and the tooth plate 14.

Figure 3:
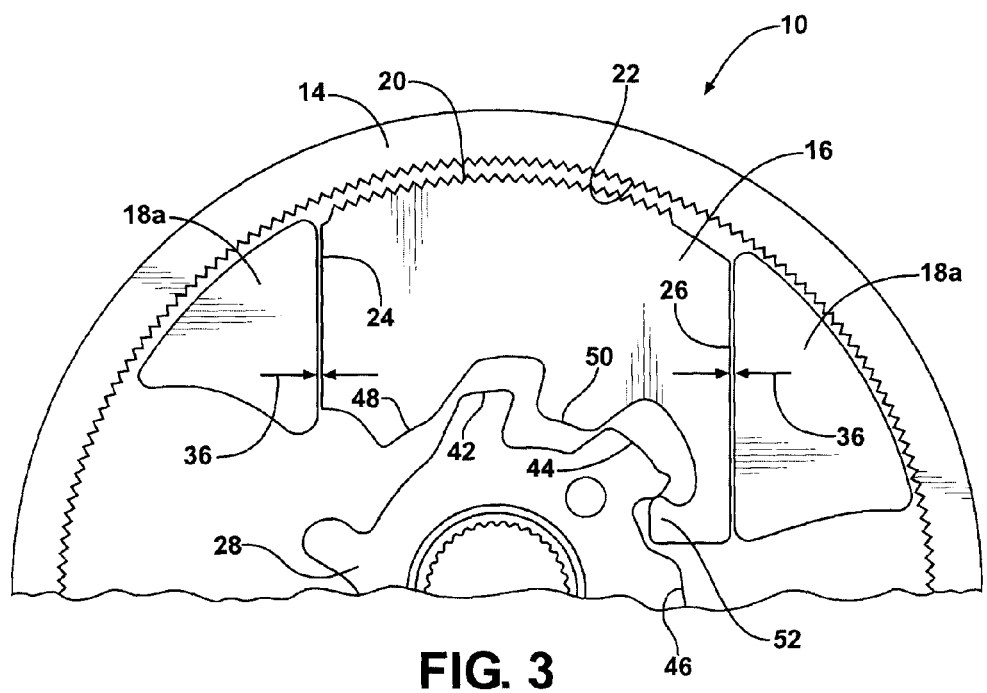
FIG. 3 is a fragmentary, cross-sectional view of the disc recliner of the first embodiment with a pawl in a retracted position.

The cam 28 is rotated in the second direction against the biasing force of the springs 30 to move the pawls 16 to a retracted position wherein the toothed outer edge 20 of the pawls 16 is disengaged with the teeth 22 on the inner radial edge of the tooth plate 14, shown in FIG. 3. In addition, a clearance or gap 36 exists between the guides 18a, 18b and the first and second sides 24, 26 of the pawls 16. When the pawls 16 are in the retracted position, the disc recliner 10 is unlocked to allow relative rotational movement between the guide plate 12 and the tooth plate 14. A control mechanism is attached to the cam 28 to rotate the cam 28 in the second direction. In the illustrated embodiment, this control mechanism is a shaft 38 to which a control handle or the like may be attached, but in other embodiments (not shown) a loss motion bushing or other suitable mechanism may be employed.

A retainer ring 40 is placed over the tooth plate 14 and is staked to the guide plate 12 to complete the assembly of the disc recliner 10. The retainer ring 40 rotatably couples the tooth plate 14 and the guide plate 12 together.

Figure 2:
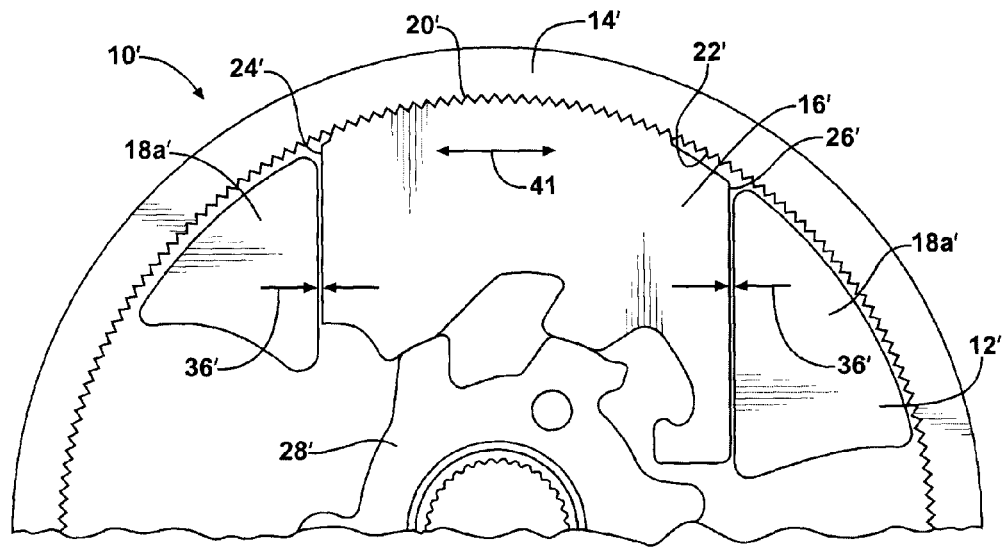
FIG. 2 is a fragmentary, cross-sectional view of a disc recliner according to the prior art.

Referring to FIG. 2, wherein primed reference numerals represent similar components to those of the first embodiment, a prior art disc recliner is indicated generally at 10'. As in the first embodiment, a cam 28' engages a radially inner cam surface of a pair of pawls 16' (only one shown) to move the pawls 16', and more specifically, a toothed outer edge 20' of the pawls 16' toward or away from teeth 22' on an inner radial edge of a tooth plate 14'. A clearance or gap 36' exists between opposite first and second sides 24', 26' of the pawl 16' and a pair of guides 18a' formed on a guide plate 12'. It is apparent that any excessive amount of clearance 36' beyond the minimum necessary to permit the pawl 16' to move radially will result in backlash of the disc recliner 10' as the pawl 16' moves generally laterally as indicated by arrow 41.

It is also apparent to those of skill in the art that if the guide plate 12', guides 18a' and/or pawls 16' are fabricated in a conventional, cost effective manner, such as by stamping and/or fine blanking, controlling the clearance 36' to the necessary tolerances is often not possible. Accordingly, to avoid the clearance 36' being excessive, it has been previously necessary to perform additional manufacturing operations to the guide plate 12', after it has been formed, to control the clearance 36'.

For example, in one prior art embodiment, a staking operation has been required to be performed to the guides 18a' to displace some material of the guides 18a' to reduce the clearance 36' to an acceptable amount. However, such a staking operation increases manufacturing costs and can, in turn, be difficult to properly control.

In contrast, the present inventors have invented the first embodiment of the disc recliner 10 wherein backlash is greatly reduced largely independent of the clearance 36 between the respective pairs of guides 18a, 18b and the opposite first and second sides 24, 26 of the pawls 16. Referring to FIG. 3, the tooth plate 14, cam 28 and one of the pawls 16 of the disc recliner 10 are shown in more detail. In FIG. 3, the cam 28 has been rotated in the second direction against the biasing force of the springs 30 by the control mechanism 38 and the pawl 16 is in the retracted position wherein the toothed outer edge 20 is disengaged with the teeth 22 on the inner radial edge of the tooth plate 14. The clearance 36 is present between the first and second sides 24, 26 of the pawl 16 and the respective pair of guides 18a. More specifically, the first and second sides 24, 26 of the pawl 16 are generally parallel with the inner guiding surfaces of the pair of guides 18a.

Figure 4:
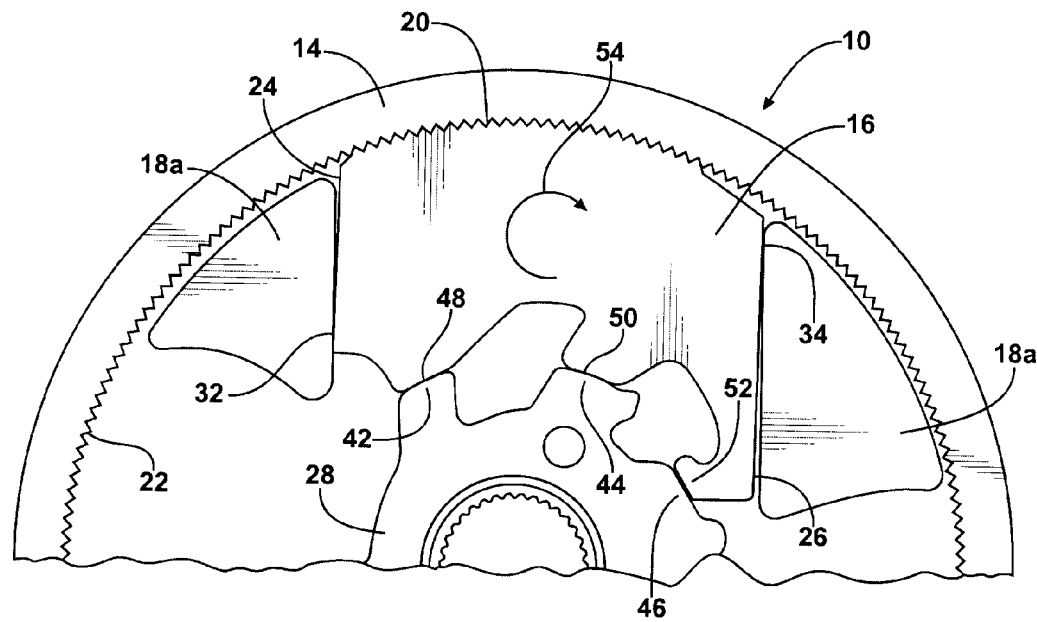
FIG. 4 is a fragmentary, cross-sectional view of the disc recliner of the first embodiment with the pawl in an extended position.

In the first embodiment, a radially outer cam profile of the cam 28 is formed to include a first lobe 42, a second lobe 44 and a third lobe 46 and the radially inner cam surface of each pawl 16 is formed to include a first cam follower 48, a second cam follower 50 and a third cam follower 52. The first, second and third lobes 42, 44, 46 on the radially outer cam profile of the cam 28 and the first, second and third cam followers 48, 50, 52 on the radially inner cam surface of the pawls 16 have been designed to provide for the conventional extension and retraction of the pawls 16 with respect to the tooth plate 14 and also to apply a rotational moment to the pawls 16 as the cam 28 is rotated in the first direction to move the pawls 16 into the extended position. As shown in FIG. 4, the rotational moment causes the pawl 16 to rotate in the second direction, as indicated by arrow 54, such that the first side 24 of the pawl 16 contacts one of the guides 18a at the first contact point 32 and the second side 26 of the pawl 16 contacts the other of the guides 18a at the second contact point 34. More specifically, the first and second sides 24, 26 of the pawl 16 are not parallel with the inner guiding surfaces of the pair of guides 18a. The contact between the pawl 16 and the guides 18a at the first and second contact points 32, 34 prevents generally lateral movement of the pawl 16 irrespective of the clearance 36, and thus inhibits backlash.

Figure 5:
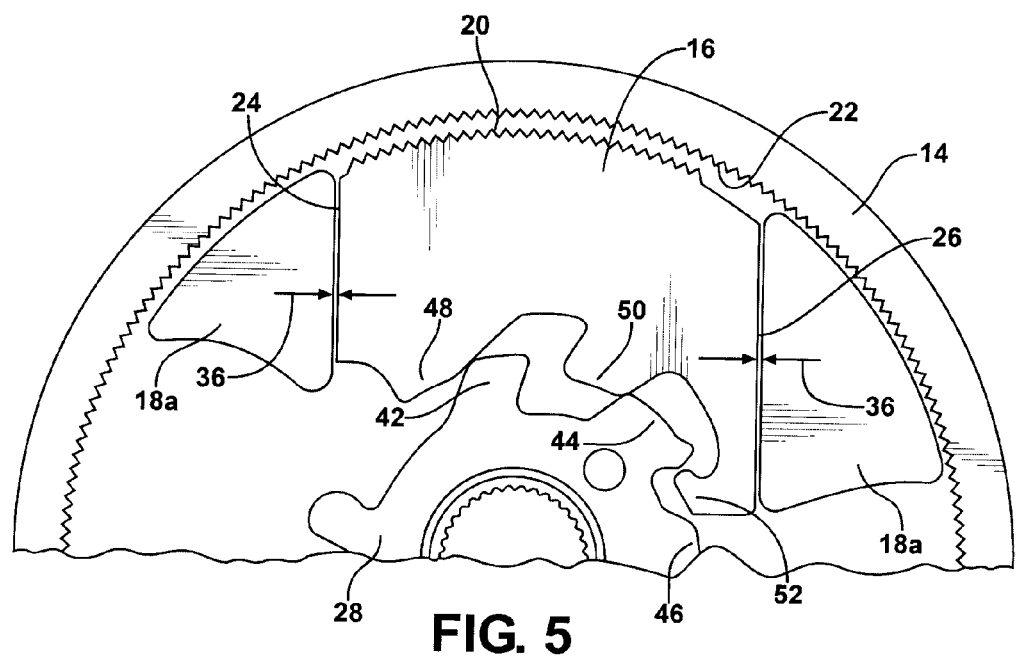
FIG. 5 is a fragmentary, cross-sectional view of the disc recliner of the first embodiment with a cam urging the pawl toward the extended position.
Figure 10:
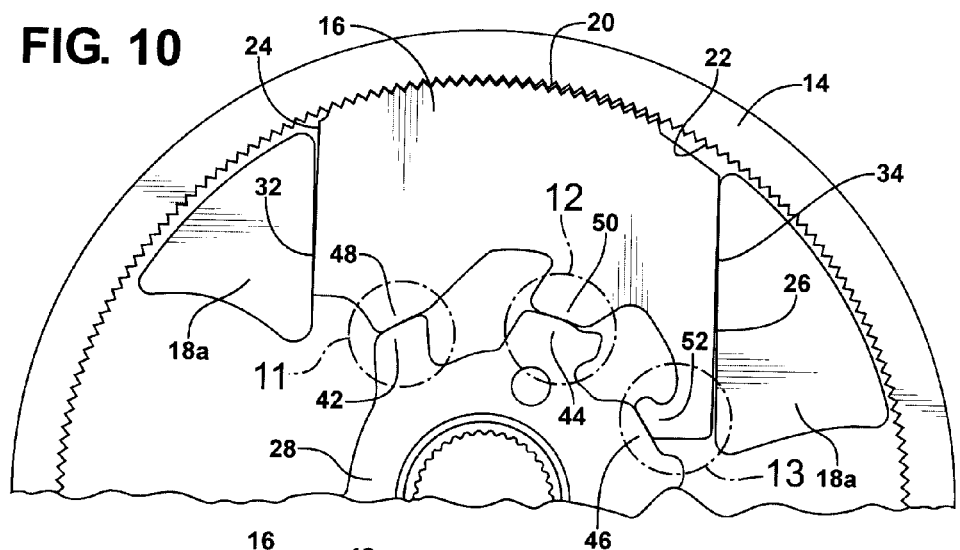
FIG. 10 is a fragmentary, cross-sectional view of the disc recliner of the first embodiment with the cam in a final locking position.
Figure 11:
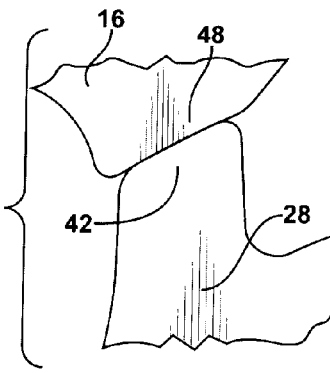
FIG. 11 is an enlarged view of a first area of FIG. 10 indicated by circle 11.
Figure 12:
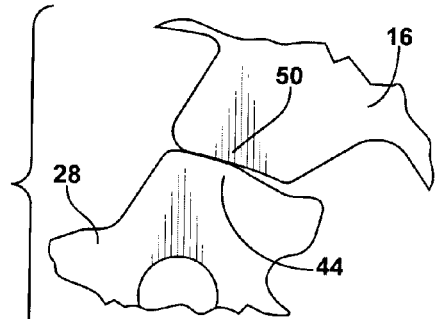
FIG. 12 is an enlarged view of a first area of FIG. 10 indicated by circle 12.
Figure 13:
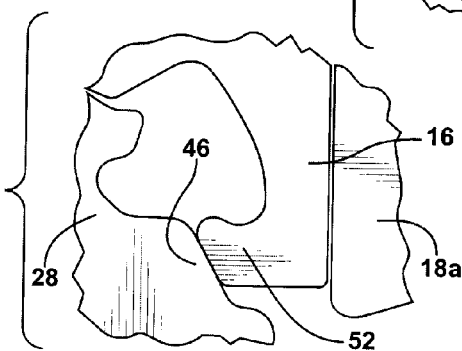
FIG. 13 is an enlarged view of a first area of FIG. 10 indicated by circle 13.

In operation, the control mechanism 38 rotates the cam 28 in the second direction to an unlocking position to move the pawls 16 radially inward to the retracted position. In the retracted position, the toothed outer edge 20 of the pawls 16 is disengaged with the teeth 22 on the inner radial edge of the tooth plate 14 and the disc recliner 10 is unlocked to allow relative rotational movement between the guide plate 12 and the tooth plate 14. Once the desired position is selected, the control mechanism 38 is released and the biasing force of the springs 30 rotates the cam 28 in the first direction. As the cam 28 rotates in the first direction, the first and second lobes 42, 44 make initial contact with the first and second cam followers 48, 50, as shown in FIG. 5, and push the pawls 16 radially outward toward engagement with the teeth 22 on the inner radial edge of the tooth plate 14. In this state, the pawls 16 are free to translate generally laterally between the guides 18a, 18b and/or to rotate in the first or second directions depending on the amount of clearance 36 between the pawls 16 and the guides 18a, 18b. The cam 28 continues to rotate in the first direction to an initial locking position, shown in FIG. 6. In the initial locking position, the first lobe 42 is in full contact with the first cam follower 48, as shown in FIG. 7, and the toothed outer edge 20 of the pawls 16 is engaged with the teeth 22 on the inner radial edge of the tooth plate 14. In this state, the pawls 16 are generally aligned between the guides 18a, 18b and the second and third lobes 44, 46 are spaced apart from and not in contact with the second and third cam followers 50, 52, as shown in FIGS. 8 and 9, respectively. The cam 28 continues to rotate in the first direction to a final locking position, shown in FIG. 10. Before the cam 28 reaches the final locking position, it forces the pawls 16 to rotate in the second direction. The pawls 16 rotate in the second direction due to the clearance 36 between the pawls 16 and the guides 18a, 18b as well as the respective spaces between the second and third lobes 44, 46 and the second and third cam followers 50, 52. In the final locking position, the first lobe 42 is in full contact with the first cam follower 48, as shown in FIG. 11, the second lobe 44 is in full contact with the second cam follower 50, as shown in FIG. 12, the third lobe 46 is in full contact with the third cam follower 52, as shown in FIG. 13, and the toothed outer edge 20 of the pawls 16 is engaged with the teeth 22 on the inner radial edge of the tooth plate 14. In this state, the first side 24 of the pawls 16 contacts one of the guides 18a at the first contact point 32 and the second side 26 of the pawls 16 contacts the other of the guides 18a at the second contact point 34.

Figure 14:
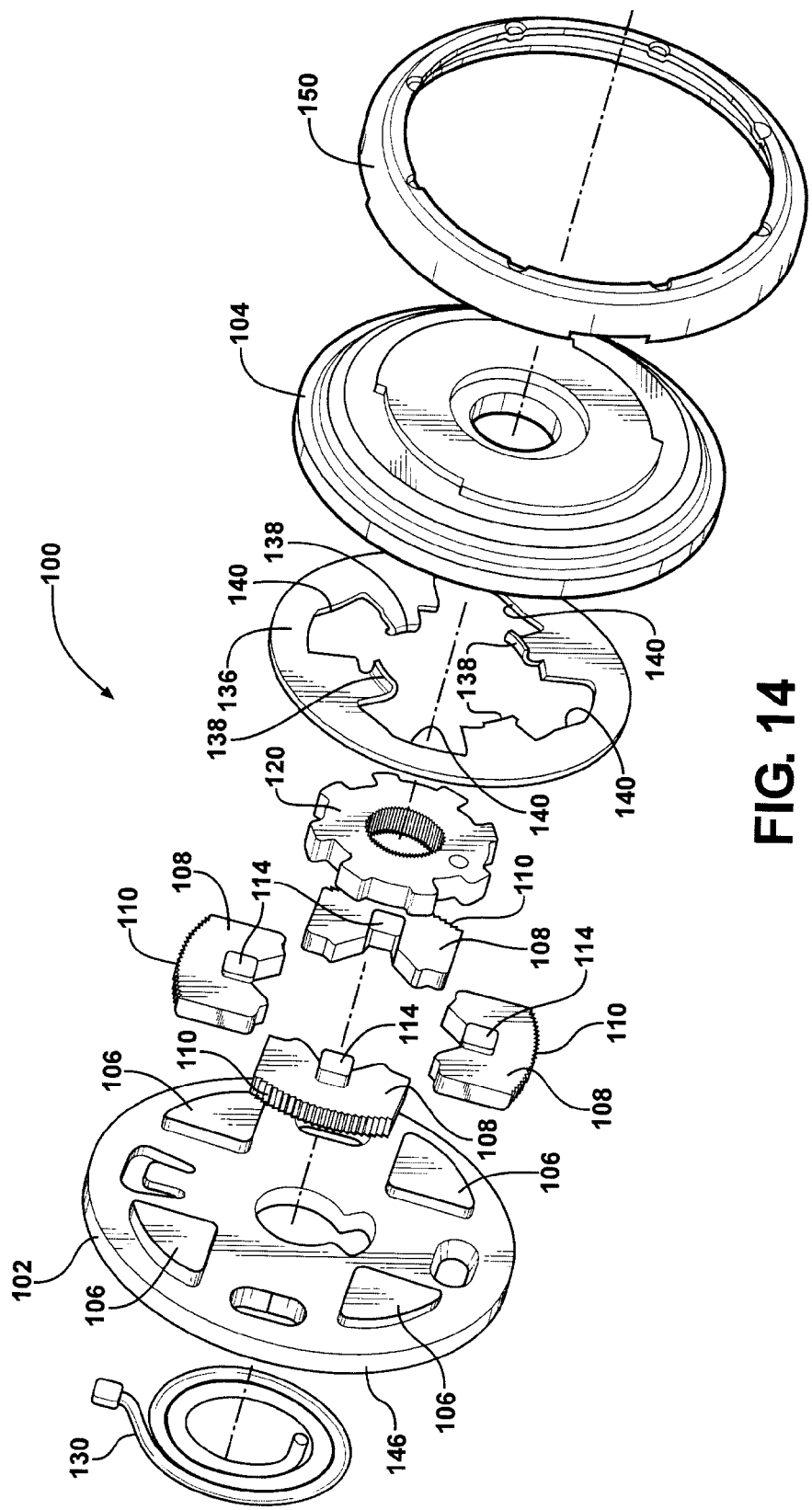
FIG. 14 is an exploded view of a disc recliner according to a second embodiment of the invention.

In a second embodiment of the invention, a disc recliner is indicated generally at 100 in FIG. 14. The disc recliner 100 is a compact disc recliner including a guide plate 102 and a tooth plate 104 rotatably coupled with the guide plate 102. The guide plate 102 includes four guides 106 that guide four pawls 108 such that a toothed outer edge 110 of the pawls 108 can be brought into and out of engagement with complimentary teeth 112 formed on an inner radial edge of the tooth plate 104, when the disc recliner 100 is assembled. The pawls 108 include a pip 114 extending in an axial direction and the pawls 108 have opposite first and second sides 116, 118.

Figure 15:
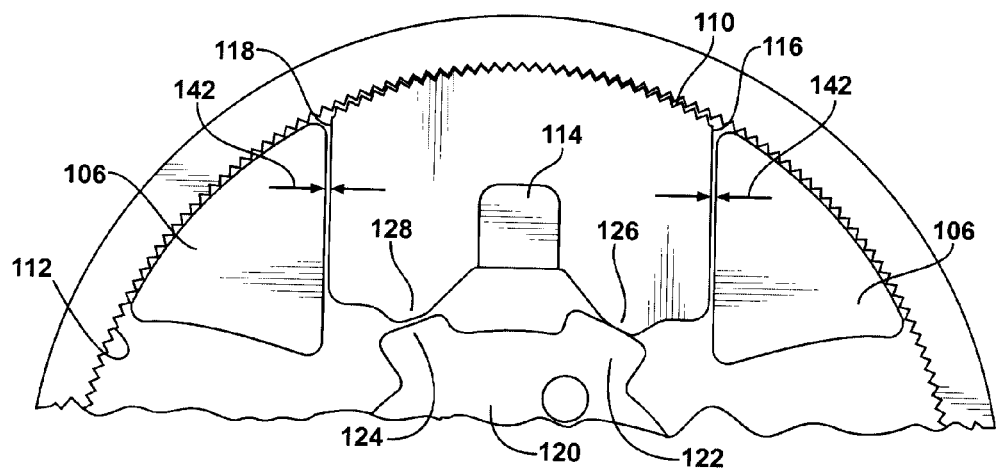
FIG. 15 is a fragmentary, cross-sectional view of the disc recliner of the second embodiment with a cam in an initial locking position.

A cam 120 includes a radially outer cam profile having a first lobe 122 and a second lobe 124 corresponding to a radially inner cam surface of each one of the pawls 108. The radially inner cam surface of each one of the pawls 108 is formed to include a first cam follower 126 and a second cam follower 128. A spring 130 biases the cam 120 in a first direction (clockwise when viewed from FIGS. 14-16) toward a position wherein the pawls 108 are in an extended position, shown in FIG. 16. In the extended position, the pawls 108 are rotated in a second direction (counterclockwise when viewed from FIGS. 14-16) such that the first and second lobes 122, 124 of the cam 120 engage the first and second cam followers 126, 128 of the pawls 108 and the first and second sides 116, 118 of the pawls 108 engage the guides 106 at first and second contact points 132, 134, respectively. Additionally, in the extended position, the toothed outer edge 110 of the pawls 108 is engaged with the teeth 112 on the inner radial edge of the tooth plate 104. Thus, when the pawls 108 are in the extended position, the disc recliner 100 is locked to prevent relative rotational movement between the guide plate 102 and the tooth plate 104.

A pawl release plate 136 is operatively coupled to the cam 120 for rotation therewith. More specifically, the pawl release plate 136 includes a plurality of drive tabs 138 that extend in the axial direction and are disposed between the first and second lobes 122, 124 on the cam 120 such that the pawl release plate 136 and the cam 120 rotate together. The pawl release plate 136 includes four slots 140 and each slot 140 receives the pip 114 on one of the pawls 108 therein. The cam 120 is rotated in the second direction against the biasing force of the spring 130 to disengage the first and second lobes 122, 124 of the cam 120 with the first and second cam followers 126, 128 of the pawls 108. At the same time, the pawl release plate 136 rotates with the cam 120 in the second direction and the profile of the slots 140 urge the pips 114 radially inward, thereby moving the pawls 108 to a retracted position wherein the toothed outer edge 110 of the pawls 108 is disengaged with the teeth 112 on the inner radial edge of the tooth plate 104. In the retracted position, a clearance or gap 142 exists between the guides 106 and the first and second sides 116, 118 of the pawls 108.

Figure 16:
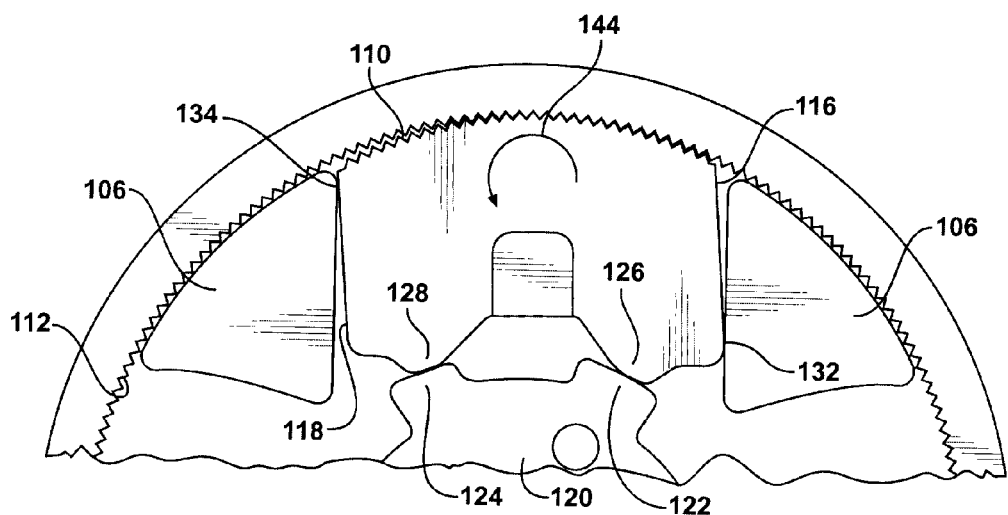
FIG. 16 is a fragmentary, cross-sectional view of the disc recliner of the second embodiment with the cam in a final locking position.

The first and second lobes 122, 124 on the radially outer cam profile of the cam 120 and the first and second cam followers 126, 128 on the radially inner cam surface of the pawls 108 have been designed to move the pawls 108 with respect to the tooth plate 104 from the retracted position to the extended position and also to apply a rotational moment to the pawls 108 as the cam 120 is rotated in the first direction to move the pawls 108 into the extended position. As shown in FIG. 16, the rotational moment causes the pawls 108 to rotate in the second direction, as indicated by arrow 144, such that the first side 116 of the pawls 108 contacts one of the guides 106 at the first contact point 132 and the second side 118 of the pawls 108 contacts the other of the guides 106 at the second contact point 134. The contact between the pawls 108 and the guides 106 at the first and second contacts points 132, 134 prevents movement of the pawls 108 irrespective of the clearance 142, and thus inhibits backlash.

Figure 17:
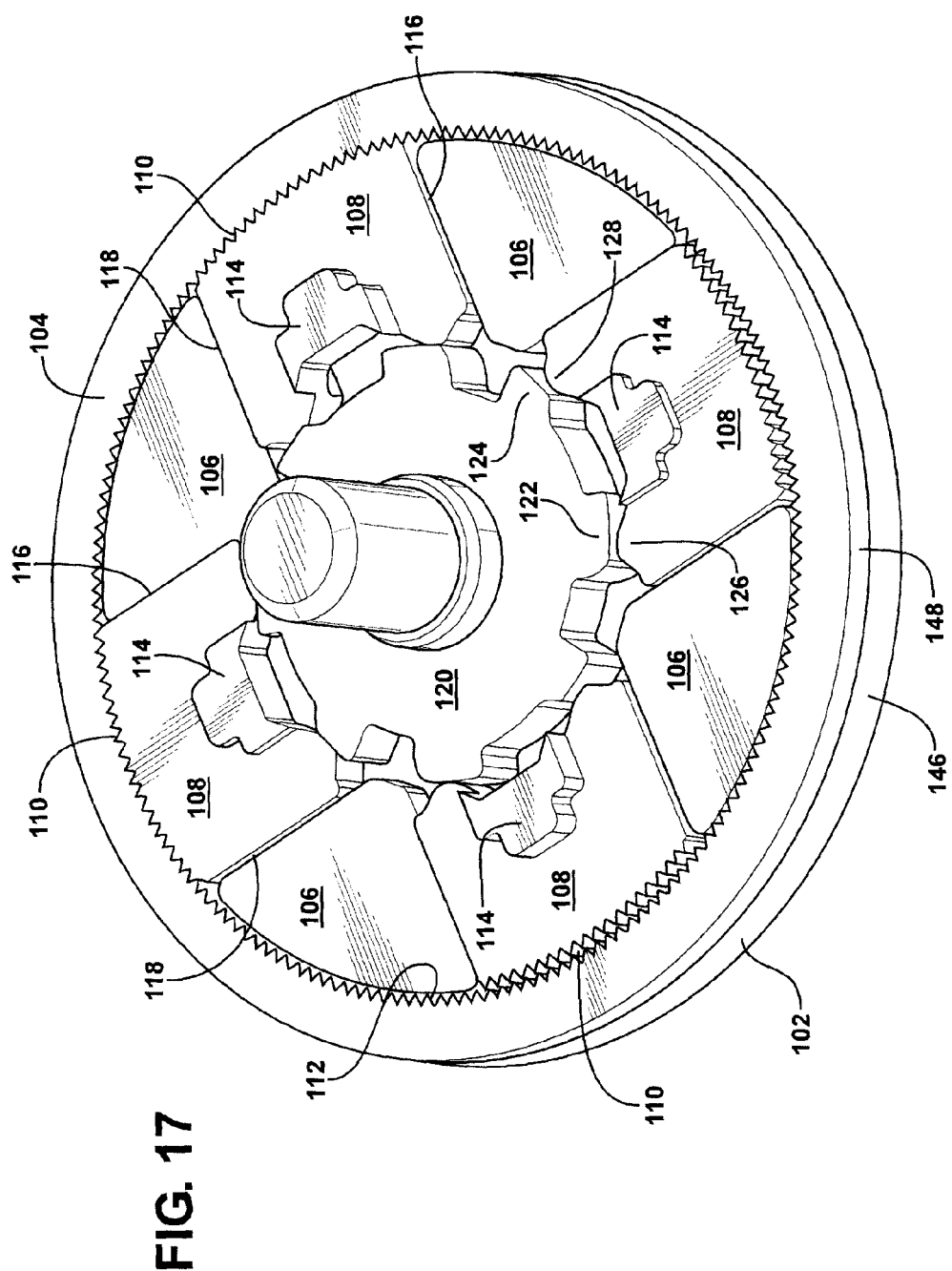
FIG. 17 is a perspective view of the disc recliner of the second embodiment with pawls in an extended position.

It is well known in the prior art for a guide plate to have a lip extending around an outer radial edge thereof to encapsulate an outer radial edge of a tooth plate. The lip of the guide plate defines an inner circumferential surface engaging an outer circumferential surface of the tooth plate to rotatably guide the tooth plate relative to the guide plate. Because the lip is sized to encapsulate the tooth plate, an outer diameter of the guide plate is necessarily larger than an outer diameter of the guide plate. In the present invention, in order to reduce the overall size of the disc recliner 100, the guide plate 102 does not include a lip and an outer diameter 146 of the guide plate 102 is substantially equal to an outer diameter 148 of the tooth plate 104, as shown in FIG. 17. Further, to rotatably guide the tooth plate 104 relative to the guide plate 102 the guides 106 are sized to interface or engage with the teeth 112 on the inner radial edge of the tooth plate 104.

A retainer ring 150 is placed over the tooth plate 104 and is staked to the outer diameter 146 of the guide plate 102 to complete the assembly of the disc recliner 100. The retainer ring 150 rotatably couples the tooth plate 104 and the guide plate 102 together.

In operation, the cam 120 is rotated in the second direction to an unlocking position which causes the pawl release plate 136 to rotate in the second direction, which moves the pawls 108 radially inward to the retracted position. In the retracted position, the toothed outer edge 110 of the pawls 108 is disengaged with the teeth 112 on the inner radial edge of the tooth plate 104 and the disc recliner 100 is unlocked to allow relative rotational movement between the guide plate 102 and the tooth plate 104. Once the desired position is selected, the biasing force of the spring 130 rotates the cam 120 in the first direction. As the cam 120 rotates in the first direction, the first and second lobes 122, 124 make initial contact with the first and second cam followers 126, 128 and push the pawls 108 radially outward toward engagement with the teeth 112 on the inner radial edge of the tooth plate 104. In this state, the pawls 108 are free to translate generally laterally between the guides 106 and/or to rotate in the first or second directions depending on the amount of clearance 142 between the pawls 108 and the guides 106. The cam 120 continues to rotate in the first direction to an initial locking position, shown in FIG. 15. In the initial locking position, the first lobe 122 is in full contact with the first cam follower 126 and the toothed outer edge 110 of the pawls 108 is engaged with the teeth 112 on the inner radial edge of the tooth plate 104. In this state, the pawls 108 are generally aligned between the guides 106 and the second lobe 124 is spaced apart from and not in contact with the second cam follower 128. The cam 120 continues to rotate in the first direction to a final locking position, shown in FIG. 16. Before the cam 120 reaches the final locking position, it forces the pawls 108 to rotate in the second direction. The pawls 108 rotate in the second direction due to the clearance 142 between the pawls 108 and the guides 106 as well as the space between the second lobe 124 and the second cam follower 128. In the final locking position, the first lobe 122 is in full contact with the first cam follower 126, the second lobe 124 is in full contact with the second cam follower 128, and the toothed outer edge 110 of the pawls 108 is engaged with the teeth 112 on the inner radial edge of the tooth plate 104. In this state, the first side 116 of the pawls 108 contacts one of the guides 106 at the first contact point 132 and the second side 118 of the pawls 108 contacts the other of the guides 106 at the second contact point 134.

The invention has been described herein in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed is:

1. A disc recliner mechanism, comprising:
a guide plate including at least one pair of guides;
a tooth plate including an inner radial edge extending circumferentially therearound, said inner radial edge having a plurality of teeth thereon;
at least one pawl mounted between said guide plate and said tooth plate, said pawl including a radially inner cam surface and a toothed outer edge, said pawl guided by said pair of guides between a retracted position with said toothed outer edge disengaged with said plurality of teeth to allow rotational movement of said tooth plate relative to said guide plate and an extended position with said toothed outer edge engaged with said plurality of teeth to prevent rotational movement of said tooth plate relative to said guide plate;
a cam rotatably mounted between said guide plate and said tooth plate, said cam including a radially outer cam profile selectively engaging and cooperating with said cam surface wherein rotation of said cam in a first direction moves said pawl radially outward with respect to said guide plate to said extended position and applies a rotational moment to said pawl thereby wedging said pawl between said pair of guides; and
a pawl release plate rotatably mounted adjacent said cam, said pawl release plate operatively coupled to said cam for rotation therewith, wherein rotation of said pawl release plate in a second direction in response to rotation of said cam in said second direction causes said pawl release plate to move said pawl radially inward with respect to said guide plate to said retracted position.

2. A disc recliner mechanism as set forth in claim 1 wherein said pawl includes a laterally extending pip, said pawl release plate engaging said laterally extending pip in response to rotation of said pawl release plate in said second direction thereby moving said pawl radially inward to said retracted position.

3. A disc recliner mechanism as set forth in claim 2 wherein said cam surface includes first and second cam followers and said cam profile includes first and second lobes.

4. A disc recliner mechanism as set forth in claim 3 wherein rotating said cam in said second direction to an unlocking position causes said pawl release plate to rotate in said second direction thereby moving said pawl radially inward to said retracted position.

5. A disc recliner mechanism as set forth in claim 4 wherein rotating said cam in said first direction from said unlocking position to an initial locking position moves said pawl radially outward to said extended position, said initial locking position defined with said first lobe contacting said first cam follower and said second lobe spaced from said second cam follower.

6. A disc recliner mechanism as set forth in claim 5 wherein rotating said cam in said first direction from said initial locking position to a final locking position rotates said pawl in said second direction thereby wedging said pawl between said pair of guides, said final locking position defined with said first and second lobes contacting said first and second cam followers.

* * * * *